United States Patent
Khairallah et al.

(10) Patent No.: US 6,810,133 B2
(45) Date of Patent: Oct. 26, 2004

(54) OCCUPANT SENSING SYSTEM AND METHOD VIA IMAGING

(75) Inventors: Farid Khairallah, Farmington Hills, MI (US); Stephen R. W. Cooper, Fowlerville, MI (US); Nicholas M. Zayan, Fenton, MI (US); Jon K. Wallace, Redford, MI (US); Chek-Peng Foo, Ann Arbor, MI (US)

(73) Assignee: TRW Inc., Lyndhurst, OH (US)

( * ) Notice: Subject to any disclaimer, the term of this patent is extended or adjusted under 35 U.S.C. 154(b) by 682 days.

(21) Appl. No.: 09/872,527

(22) Filed: Jun. 1, 2001

(65) Prior Publication Data
US 2002/0181743 A1 Dec. 5, 2002

(51) Int. Cl.[7] .................................................. G06K 9/00
(52) U.S. Cl. ..................... 382/104; 340/425.5; 348/143; 348/148; 701/45; 701/49; 280/735
(58) Field of Search .................................. 382/104, 115; 348/143, 148, 152; 340/425.5, 426.1, 429, 507; 701/45, 49, 207; 280/735

(56) References Cited

U.S. PATENT DOCUMENTS

| | | | |
|---|---|---|---|
| 4,937,878 A | 6/1990 | Lo et al. ...................... 382/103 |
| 5,528,698 A | 6/1996 | Kamei et al. ................. 382/100 |
| 5,531,472 A * | 7/1996 | Semchena et al. .......... 280/735 |
| 5,829,782 A * | 11/1998 | Breed et al. ................. 280/735 |
| 5,848,802 A * | 12/1998 | Breed et al. ................. 280/735 |
| 5,901,236 A | 5/1999 | Mizui ........................... 382/104 |
| 5,940,139 A | 8/1999 | Smoot .......................... 348/584 |
| 5,983,147 A | 11/1999 | Krumm ......................... 701/45 |
| 6,005,958 A * | 12/1999 | Farmer et al. ............... 382/103 |
| 6,049,747 A | 4/2000 | Nakajima et al. .............. 701/45 |
| 6,088,640 A | 7/2000 | Breed ............................ 701/45 |
| 6,101,289 A | 8/2000 | Kellner ........................ 382/276 |
| 6,621,411 B2 * | 9/2003 | McCarthy et al. ........ 340/425.5 |

* cited by examiner

Primary Examiner—Bhavesh M. Mehta
Assistant Examiner—Abolfazl Tabatabai
(74) Attorney, Agent, or Firm—Tarolli, Sundheim, Covell & Tummino L.L.P.

(57) ABSTRACT

An occupant sensing system (12) and an associated method provide for the sensing of an occupant (14). An illuminating element (46) of the system (12) selectively illuminates the interior of a vehicle (8). An image sensor (50) acquires a first image of the interior of the vehicle (8) when the interior of the vehicle is illuminated by ambient sources only and acquires a second image of the interior of the vehicle when the interior of the vehicle is illuminated by ambient sources and the illuminating element (46). A controller (34) removes the effect of ambient sources by comparing the first and second images to produce a third image of the interior of the vehicle (8) as illuminated by the illuminating element (46) only. The controller (34) determines the presence of an occupant (14) by comparing the third image to a produced map of the interior of the vehicle (8).

19 Claims, 2 Drawing Sheets

OCCUPANT SENSING SYSTEM AND METHOD VIA IMAGING

TECHNICAL FIELD

The present invention is directed to an occupant sensing system and an associated method, and is particularly directed to occupant sensing using an image sensor to sense an occupant.

BACKGROUND OF THE INVENTION

Occupant protection systems are well known in the art and are employed in vehicles to restrain vehicle occupants during a vehicle crash event. Most occupant protection systems include one or more actuatable components, such as an air bag, a seat belt pretensioner, a side curtain, etc. During a crash event, these components may be actuated to physically engage the occupant and restrain the occupant during the crash event.

Deployment or actuation of the actuatable component is usually dependent upon numerous criteria, such as crash conditions and/or occupant characteristics. With respect to crash conditions, a crash condition may be indicated by a crash metric, such as crash acceleration, crash velocity, crash displacement, etc. For example, if a crash metric, such as crash acceleration, is greater than a predetermined threshold crash acceleration value, then this may be regarded as an indication that the crash event is a deployment crash event (e.g. a crash event having a magnitude and/or duration great enough to warrant actuation of the actuatable protection component).

With respect to occupant characteristics, occupant characteristics may include presence, position, and weight of the occupant. Deployment or actuation of the actuatable protection component may be dependent upon occupant characteristics. With reference to an air bag, for example, deploying the air bag is wasteful if an occupant is not present. Also, depending on the size and position of an occupant that is present, deploying the airbag may not provide enhance protection of the occupant. Thus, it may be desirable to suppress actuation. Alternatively, depending on the size and position of an occupant that is present, it may be desirable to only inflate the air bag to a partial amount of the total pressure.

To sense crash conditions, a variety of sensors may be placed at a variety of locations throughout the vehicle. These sensors sense the conditions and output signals indicative thereof. The signals are usually sent to a controller (typically a microprocessor or microcomputer). The controller then uses these signals to control actuation of the actuatable restraining component in a known manner (e.g. by determining whether a crash event is a deployment crash event).

With respect to sensing occupant characteristics, such as the presence of an occupant, several different arrangements and methodologies have been developed to sense these characteristics. For example, imaging technologies have been utilized to acquire an image of the interior of a vehicle to determine the presence and/or position of an occupant.

U.S. Pat. No. 6,005,958 discloses a camera unit that is used to generate image data of the front seating area of the vehicle. Objects and occupants are distinguished through periodic mapping of the image taken by the camera unit. Stored profile data is utilized to determine the occupant or object type.

U.S. Pat. No. 5,531,472 discloses an image sensor that is used to obtain image data which is representative of an occupant on a vehicle seat. The image data is compared to stored image data to obtain the occupant's size and position within the vehicle.

U.S. Pat. No. 5,528,698 discloses an image sensor that acquires a representation of the passenger seat area within a vehicle. Objects within the field of view of the sensor are discriminated to determine whether a rear facing child seat is located in the passenger seat.

While the related art patents may use an image sensor in the determination of the presence of an occupant, these patents do not account for any ambient lighting conditions which may affect the viewable image of the interior of the vehicle. Such ambient conditions may for example include shadows and/or lighting variations that occur within the interior vehicle. Accordingly, it would be desirable to develop a true presentation of the interior of the vehicle that is devoid of any effects from ambient lighting effects.

SUMMARY OF THE INVENTION

The present invention is directed to an occupant sensing system and an associated method and more particularly to an occupant sensing system and an associated method that uses an image sensor to sense the presence of an occupant.

According to one aspect of the present invention, the system includes an illuminating element for selectively illuminating the interior of a vehicle. The system also includes an image sensor for acquiring a first image of the interior of the vehicle when the interior of the vehicle is illuminated by ambient sources only. The image sensor also acquires a second image of the interior of the vehicle when ambient sources and the illuminating element illuminate the interior of the vehicle. A controller is included for removing the effect of ambient sources by comparing the first and second images. The controller thereby produces a third image of the interior of the vehicle as illuminated by the illuminating element only. The controller also determines the presence of an occupant by comparing the third image to a produced map of the interior of the vehicle.

According to another aspect of the present invention, to produce the map, the image sensor acquires a first map of the interior of the vehicle when the interior of the vehicle is illuminated by ambient sources only and acquires a second map of the interior of the vehicle when the interior of the vehicle is illuminated by ambient sources and the illuminating element. The controller removes the effect of ambient sources from the map by comparing the first and second maps thereby producing the map of the interior of the vehicle as illuminated by the illuminating element only.

According to another aspect of the present invention, an aspect of the interior of the vehicle constitutes a background within the third image and the map. The controller determines the presence of an occupant by determining whether a portion of the background visible in the map is not visible in the third image.

According to another aspect of the present invention, a method for sensing an occupant is disclosed. The method includes the steps of acquiring a first image of the interior of the vehicle when the interior of the vehicle is illuminated by ambient sources only and acquiring a second image of the interior of the vehicle when the interior of the vehicle is illuminated by ambient sources and an illuminating element. The method also includes the step of removing the effect of ambient sources by comparing the first and second images thereby producing a third image of the interior of the vehicle as illuminated by the illuminating element only. The method further includes the step of determining the presence of an occupant by comparing the third image to a produced map of the interior of the vehicle.

According to another aspect of the present invention, the method also includes the steps of acquiring a first map of the interior of the vehicle when the interior of the vehicle is illuminated by ambient sources only and acquiring a second map of the interior of the vehicle when the interior of the vehicle is illuminated by ambient sources and the illuminating element. The method also includes the step of removing the effect of ambient sources from the map by comparing the first and second maps thereby producing the map of the interior of the vehicle as illuminated by the illuminating element only.

According to yet another aspect of the present invention, the method further includes the step of determining the presence of an occupant by determining whether a portion of a background visible in the map is not visible in the third image.

BRIEF DESCRIPTION OF THE DRAWINGS

The foregoing and other features and advantages of the present invention will become more apparent to one skilled in the art upon consideration of the following description of the invention and the accompanying drawings, wherein.

DESCRIPTION OF AN EXEMPLARY EMBODIMENT

Figure 1:
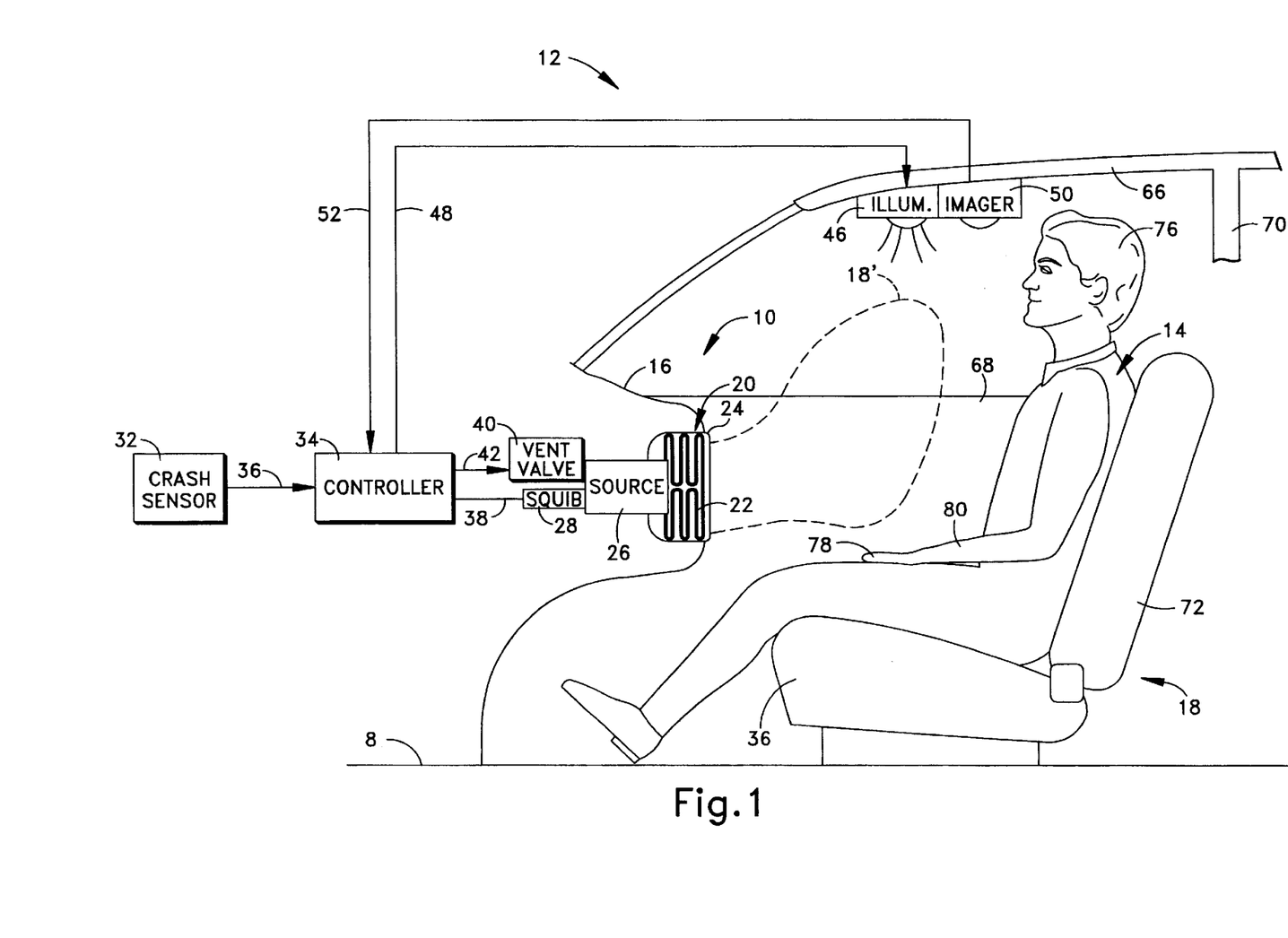
FIG. 1 is a schematic diagram of a vehicle that includes an occupant protection system wherein the present invention is incorporated.

A vehicle 8, which has an example occupant protection system 10 with an example occupant sensing system 12 in accordance with the present invention, is shown in FIG. 1. A vehicle occupant 14 along with several aspects of the vehicle interior, such as an instrument panel 16 and an occupant seat 18, are shown in FIG. 1.

In the presented example, the occupant protection system 10 includes an air bag module 20. An air bag 22 of the module 20 is operatively mounted in a folded condition within a housing 24 of the module. The housing 24 is mounted within the instrument panel 16 of the vehicle 8.

The module 20 includes a source 26 of inflation fluid (e.g., gas) to inflate the air bag to a deployed state (shown in phantom and identified by numeral 22'). In the shown example, the inflation fluid source 26 includes a pyrotechnic material that is ignited by a squib 28. Combustion of the pyrotechnic material generates gas (e.g., nitrogen gas). In an alternative embodiment, the inflation fluid source 26 is a pressurized container of gas, and the squib 28 opens the container to thereby discharge the gas into the air bag 22. It is to be appreciated that the configuration of the occupant protection system 10, including the actuatable protection device of the air bag module 20, is not a limitation on the present invention, and that the presented embodiment is to only provide an example environment to present the present invention.

A crash sensor 32 is included within the occupant protection system 10 to sense a vehicle crash event and output a signal indicative thereof. The crash sensor 32 may take any suitable form, such as an acoustic crash sensor or inertia switch (accelerometer) that outputs a signal indicative of a crash condition, such as crash acceleration or other crash metric. A controller 34 is operatively connected 36 to receive the signal from the crash sensor 32.

In general, the controller 34 controls actuation the air bag module 20. In the illustrated example, the controller 34 is operatively connected 38 to the squib 28 to provide an actuating (ignition) signal to the squib. The controller 34 is typically a microcomputer or microprocessor. Alternatively, the controller 34 may be provided by one or more digital and/or analog circuits. Also, the controller 34 may be provided within an application specific integrated circuit.

As one aspect of the control process performed by the controller, the signal output by the crash sensor 32 is used to determine if a crash event is occurring. In particular, it is determined if the crash event is a deployment crash event. In one example, the controller 34 is programmed with an algorithm that compares the value of the sensed crash metric to the value of a threshold crash metric. For instance, the controller 34 is programmed to determine if the value of the sensed crash metric exceeds the value of the threshold crash metric. If the value of the sensed crash metric exceeds the value of the threshold crash metric, the controller 34 is programmed to regard this as an indication that the crash event is a deployment crash event (e.g. a crash event that has a magnitude and/or duration sufficient to warrant actuation of the air bag). The threshold crash metric information is often empirically determined for a particular platform of interest and stored within memory of the controller.

The controller 34 controls the rate and degree of air bag inflation in any of a number of ways, thus the deployment of the air bag is adjustable. In the illustrated example, the deployment is adjustable via use of a vent device 40 that is connected to the housing 24/air bag 22. The vent device 40 may take any of a variety of forms, such as an electrically controlled regulator or valve that responds to a control signal.

The controller 34 is operatively connected 42 to the vent device 40 to provide the control signal to the vent device. In response to the control signal provided by the controller 34, the vent device 40 opens or closes to vent a portion of inflation gas away from the air bag 22. Thus, the controller 34 controls the amount of inflation fluid provided to the air bag 22 by controlling the extent to which the vent device 40 is opened. When fully opened, the vent device 40 vents a maximum portion of inflation gas away from the air bag 22 and the air bag is only partially inflated. Conversely, when the vent device 40 is not opened or is only opened slightly, the vent device vents very little inflation gas away from the air bag 22 and the air bag is fully deployed at a relatively rapid rate.

Another function of the controller is to make determinations regarding the presence and/or position of an occupant as part of the occupant sensing system, in accordance with the present invention. The determinations of the presence and/or position of an occupant are based upon sensory information and are used to control the actuation/adjustment of the air bag.

As part of the structure for obtaining sensory information regarding the presence and/or position of an occupant, an illuminating element 46 is located within the interior of the vehicle 8. The illuminating element 46 is operatively connected 48 to the controller 34 and selectively illuminates the interior of the vehicle in response to a control signal provided by the controller 34. By selectively illuminates, it is meant that the illuminating element 46 only illuminates the interior of the vehicle 8 when it is turned on or activated by the controller 34. The illuminating element 46 does not illuminate the interior of the vehicle 8 when it is not turned on or not activated by the controller 34. It is to be appreciated that any type of illuminating element can be used. For example, the illuminating element 46 may be a strobe type of light that operates near or in the infrared range such that illumination from the illuminating element is not visible to human vision. The illuminating element 46 may be configured or programmed to strobe or flash on and off at a predetermined rate such that its activation and deactivation is independent of control signal issued by the controller 34.

An image sensor 50 is located within the interior of the vehicle 8 and operatively connected 52 to the controller 34. The image sensor 50 may be any type of sensor suitable for acquiring an image of the interior of the vehicle 8. For instance, the image sensor 50 may take the form of a CCD (charge coupled device) image sensor such as sensor Model No. IK-M40A provided by Toshiba America C.P. Inc. This is a fixed lens camera that employs a ½ inch 420,000 pixel CCD image sensor having 460 lines of horizontal resolution. This is provided with a camera head that measures approximately 1½ inches in length and ⅝ inch in diameter and weighs approximately ½ ounce. An image captured by the camera is two-dimensional and is provided within the sensor by an array of pixels. The array may, for example, be 640 pixels wide (x-axis image data) and 480 lines or pixels tall (y-axis image data). Other examples for the image sensor 50 include a CMOS-type device.

The image sensor conveys a signal indicative of the acquired image to the controller 34. In one embodiment, the image sensor 50 is controlled to acquire the images of the interior of the vehicle 8 in response to control signals issued by the controller 34. Alternatively, the image sensor 50 may be preprogrammed or configured to automatically acquire the images of the interior of the vehicle 8 at one or more predetermined frequencies. In this fashion, control signals issued by the controller 34 are unnecessary.

The image sensor 50, as well as the illuminating element 46, may be mounted in any of a variety of suitable locations within the vehicle. For instance, in the example illustrated, both the image sensor 50 and the illuminating element 46 are located in front of the occupant 14 at an overhead location. It is to be appreciated, however, that the image sensor 50 and the illuminating element 0.46 do not need to be so co-located. They may each be situated at different locations within the interior of the vehicle 8. The image sensor 50 need only be situated so that it can acquire an image of the interior of the vehicle 8 at the location intended for the occupant (e.g., the seat location). The illuminating element 46 need only be situated within the interior of the vehicle 8 such that it illuminates the portion of the interior of the vehicle perceived by the image sensor 50.

To determine the presence and/or position of an occupant (e.g., occupant 14) the image sensor 50 initially acquires a first image of the interior of the vehicle when the illuminating element 46 is off. In this scenario, the interior of the vehicle 8 is illuminated by ambient sources only. The image sensor 50 then acquires a second image of the interior of the vehicle 8 when the illuminating element 46 is on. In this scenario, both ambient sources as well as the illuminating element 46 illuminate the interior of the vehicle 8. The first and second images are compared to one another as part of the determination of the presence and/or position of the occupant 14. It is to appreciated that because the illuminating element 46 is only on when the image sensor 50 acquires the second image of the interior of the vehicle 8, the illuminating element need only be actuated or turned on at one half the frequency of operation of the image sensor 50.

Generally speaking, the ambient sources that illuminate the interior of the vehicle 8 include sunlight as well as any other natural and/or artificial sources, other than the illuminating element 46 itself. The occupant sensing system 12 is operable in the presence of any type of ambient light. It is only preferred that the first and second images be acquired under the same or very similar ambient conditions. By the same or similar ambient conditions, it is merely meant that the magnitude and direction of ambient illumination present when the first image is acquired are the same or very similar to the magnitude and direction of ambient illumination when the second image is acquired. This ensures that any effects created by ambient illumination will be the same in the first and second images. For instance, any shadows that may stream across the interior of the vehicle will be the same (e.g. have the same intensity and direction) in the first image as in the second image. By promoting the consistency of ambient sources and therefore any effects created thereby, the effect is to yield a very true representation of the interior of the vehicle 8 as illuminated by the illuminating element only. This true representation of the interior of the vehicle 8 is commonly referred to herein as the third image of the interior of the vehicle and, as will be discussed in more detail below, is used in the determination of the presence and/or position of an occupant.

So that the first and second images are acquired under the same or very similar ambient conditions, it is preferred that the first and second images are acquired in rapid succession. Acquiring the first and second images with a very small time delay in between reduces the likelihood that the ambient sources that illuminate the interior of the vehicle 8 when the first image is acquired will be different from those ambient sources that illuminate the interior of the vehicle when the second image is acquired.

To remove the effect (e.g. shadows, etc.) of ambient sources, the first and second images of the interior of the vehicle 8 are compared to one another to develop the third image of the interior of the vehicle. By removing the effects of ambient sources, the effects of lighting variations, such as shadows, etc., are removed from the third image of the interior of the vehicle 8.

The third image of the interior of the vehicle 8 may be developed in any of a number of ways. For instance, the first and second images of the interior of the vehicle 8 may be differenced (e.g., a subtraction of one from the other) to develop the third image. More particularly, because the first and second images are each an array of pixels acquired by the image sensor 50, each pixel in each array may be considered as having a charge corresponding to the total illumination energy (e.g. photon energy) received at each pixel. Accordingly, the total illumination energy at each pixel in the first image is a function of ambient illumination only because the interior of the vehicle 8 is illuminated by ambient sources only when the image sensor 50 acquires the first image. In the second image, however, the total illumination energy received at each pixel is a function of both ambient illumination as well as illumination resulting from the illuminating element 46 because the interior of the vehicle 8 is illuminated by both ambient sources as well as the illuminating element when the second image is acquired by the image sensor 50.

To remove the effects of ambient sources and develop the third image of the interior of the vehicle 8 as illuminated by the illuminating element 46 only, a pixel-by-pixel subtraction of the first image from the second image may be performed. For instance, each pixel in the first and second images may have an associated x axis address and an associated y axis address which corresponds to the location of each pixel within the image sensor (e.g., CCD or CMOS)

array. Subtracting the charge of a pixel in the first image having a particular x, y address from the charge of the pixel in the second image having the same x, y address removes or subtracts out the charge resulting from ambient sources. More particularly, because the first and second images are acquired under the same or very similar ambient sources, the portion of the charge attributable to ambient sources in each of the pixels (that have the same x, y address in the first and second images) is the same or very nearly the same. Accordingly, the pixel-by-pixel subtraction subtracts out the ambient photon energy present in corresponding pixels in the first and second images. Accordingly, only the photon energy that was originally present in the second image as a result of the illuminating element 46 remains in the third image. The third image of the interior of the vehicle 8 is therefore only a function of photon energy that results from the illuminating element 46. Any shading or other effects that are the result of ambient sources are removed or subtracted out from the third image of the interior of the vehicle 8. The third image is thereby a representation of the interior of the vehicle 8 as illuminated by the illuminating element 46 only where the effects of ambient lighting, such as shadows, etc., have been removed.

It is to be appreciated that many aspects of the interior of the vehicle 8 are within the purview of the image sensor 50. The degree to which these aspects are viewed by the image sensor 50 and therefore the degree to which they appear in the images acquired by the image sensor is, of course, dependent upon their location within the interior of the vehicle 8 in relation to the image sensor. Such interior aspects of the vehicle 8 may include, for example, the instrument panel 16, the seat 18, a headliner 66, an interior door/window frame surface 68, and an interior pillar surface 70. Some of these aspects, such as the seat 18, are moveable within the interior of the vehicle 8. By moveable it is meant that these aspects can be selectively located or maneuvered into a plurality of different positions within the interior of the vehicle 8. Other aspects of the interior of the vehicle 8, such as the instrument panel 16 and the pillar surface 70, however, are fixed such that they do not move within the interior of the vehicle 8.

Any one or more of these aspects may be regarded as a background within the images acquired by the image sensor 50. By background, it is meant that the aspect appears as a solid structure and acts as a landmark within the images. When a moveable aspect is regarded as the background, the background is referred to as a moveable background. On the other hand, however, when a fixed aspect is regarded as the background, the background is referred to as a fixed background. For instance, where the instrument panel 16 is regarded as the background, the background is said to be fixed. Alternatively, where the seat 18 is regarded as the background, the background is said to be moveable.

In the example illustrated, because the image sensor 50 is located at an overhead location in front of the occupant 14, a seatback 72 of the seat 18 is likely within the purview of the image sensor 50. The seatback 72 may very well, then, be a background within the first, second and third images as well as maps (discussed below) of the interior of the vehicle 8. As will be discussed in further detail below, the background is utilized in the determination of the presence and/or position of the occupant 14.

The charge values provided via the image sensor (e.g., CCD or CMOS) array, that make up the third image of the interior of the vehicle 8, can be recognized by the controller 34 in any of a number of ways. In a rudimentary embodiment, for example, the controller 34 may be configured to regard the charge of each pixel within the third image as either being on or off. A comparator may be incorporated into the controller 34 to compare the charge of each pixel to a threshold charge. When the pixel charge is above the threshold level, the comparator outputs a high level signal corresponding to an on state of the pixel. Conversely, when the pixel charge is below the threshold level, the comparator outputs a low-level signal corresponding to an off state of the pixel. To produce a black and white third image of the interior of the vehicle 8, the pixels that are off have no color and appear black whereas the pixels that are on appear as white.

Alternatively, in a somewhat more sophisticated embodiment, rather than a single threshold charge, each pixel within the image sensor array may be compared to a plurality of charge thresholds, such as 256 discrete levels, where each of the 256 charge thresholds corresponds to a different shade of gray. For instance, the controller 34 may be programmed to determine, such as through a comparison algorithm, which one of the 256 discrete charges the charge of each pixel is nearest to. The pattern of pixel charges is thereby recognizable as a black and white third image of the interior of the vehicle 8.

To further refine the resolution of the third image, the controller 34 may also be programmed to perform a histogram to optimize the contrast between black and white. More particularly, the controller 34 can shift the whites whiter, the blacks darker and distribute gray shades evenly from white to black. Such image processing may make edges, such as seat edges, more distinguishable. For instance, after such image processing, a pixel that is a particular shade of gray may have a heightened contrast relative to neighboring pixels. More particularly, the shade of gray that that pixel is may be much darker than that of neighboring pixels. The particular shade of gray of the pixel and/or the degree of contrast between that pixel and neighboring pixels may make an edge represented by this as well as other similarly processed pixels more distinguishable.

In addition to developing the third image of the interior of the vehicle 8 as illuminated by the illuminating element only, one or more of the maps of the interior of the vehicle may be created. The third image is compared to the map(s) to determine the presence and/or position of the occupant 14.

Similar to the development of the third image, in the development of a map of the interior of the vehicle 8, the image sensor 50 initially acquires a first map of the interior of the vehicle when the interior of the vehicle is illuminated by ambient sources only. The image sensor 50 then acquires a second map of the interior of the vehicle 8 when ambient sources as well as the illuminating element illuminate the interior of the vehicle. Like the first and second images of the interior of the vehicle 8, the first and second maps are essentially images of the interior of the vehicle. However, the first and second maps are acquired when an occupant is not present (i.e., absent) within the vehicle 8, whereas the first and second images are acquired when the occupant 14 may be present within the interior of the vehicle. Again, as with the first and second images of the interior of the vehicle 8, to maintain the consistency of ambient sources when the first and second maps are acquired so that any effects created thereby can be subtracted out later, it is preferred that the first and second maps are acquired in rapid succession with a minimal time delay in between.

By way of example only and not for the purposes of limiting the present invention, assume that the seatback 72 serves as the background within the images acquired by the image sensor. Assume further that the seatback 72 may be maneuvered into ten different positions within the interior of the vehicle 8. It is to be appreciated that, in this instance, because the background is moveable, more than one map needs to be developed (e.g. one corresponding to each of the ten different positions of the moveable seatback). This is in contrast to the situation where the background is fixed, in which case only one map of the interior of the vehicle 8 needs to be developed.

If the seatback 72 is maneuverable into ten different positions, then ten different maps of the interior of the vehicle 8 need to be developed so that, regardless of the position of the seatback in the third image, the third image may be compared to an occupant free map of the interior of the vehicle corresponding to that particular seatback position to determine the presence and/or position of the occupant 14. To develop the ten different maps of the interior of the vehicle 8, the image sensor 50 acquires first and second maps of the interior of the vehicle for each of the ten different positions of the seatback 72. It is to be appreciated that because the image sensor 50 acquires the first and second maps in rapid succession, the position of the seatback 72 does not change when the image sensor acquires the first and second maps.

For each of the ten different seatback positions, the first and second maps for each seatback position are compared to one another to remove the effect of ambient sources. A map of the interior of the vehicle 8 is thereby arrived at for each seatback position. As discussed above, by removing the effects of ambient sources, it is meant that the effects of lighting variations, such as shadows, etc., are removed from each of the ten maps of the interior of the vehicle 8. Each map is thereby an occupant free representation of the interior of the vehicle 8 as illuminated by the illuminating element 46 only where the effects of ambient lighting, such as shadows, etc. have been removed.

As with the third image of the interior of the vehicle 8, each of the ten maps of the interior of the vehicle may be developed in any of a number of ways. For instance, for a particular seatback position, the first and second maps of the interior of the vehicle 8 for that seatback position may be differenced (e.g., subtracted) to develop the map for that seatback position. More particularly, because the first and second maps are each an array of pixels acquired by the image sensor 50, each pixel in each array may be considered as having a charge corresponding to the total illumination energy (e.g. photon energy) received at that pixel.

For one particular seatback position, for example, the total illumination energy at each pixel in the first map for that seatback position is a function of ambient illumination only because the interior of the vehicle 8 is illuminated by ambient sources only when the first map is acquired by the image sensor 50 for that seatback position. In the second map for that same seatback position, however, the total illumination energy received at each pixel is a function of both ambient illumination as well as illumination resulting from the illuminating element 46 because the interior of the vehicle 8 is illuminated by both ambient sources as well as the illuminating element when the second map is acquired by the image sensor 50 for that particular seatback position.

Again as with the first and second images of the interior of the vehicle 8, for each particular seatback position, to remove the effects of ambient sources and develop a map for that seatback position as illuminated by the illuminating element 46 only, a pixel-by-pixel subtraction of the first map from the second map may be performed. For instance, each pixel in the first and second maps may have an associated x axis address and an associated y-axis address that corresponds to the location of that pixel within the CCD array. Subtracting the charge of a pixel in the first map having a particular x, y address from the charge of the pixel in the second map having the same x, y address removes or subtracts out the charge resulting from ambient sources. More particularly, because the first and second maps are acquired under the same or very similar ambient sources, the portion of the charge attributable to ambient sources in each of the pixels (having the same x, y address in the first and second maps) is the same or very nearly the same. Accordingly, the pixel-by-pixel subtraction subtracts out the ambient photon energy present in corresponding pixels of the first and second maps and leaves only the photon energy present in the second image that results from the illuminating element 46. The resulting map of the interior of the vehicle 8 for that particular seatback position is therefore only a function of photon energy that results from the illuminating element. Any shading or other effects that are the result of ambient sources are thereby removed or subtracted out from the map of the interior of the vehicle 8 for that particular seatback position.

Again as with the third image, the pattern of pixel charges making up the maps of the interior of the vehicle 8 can be recognized as the interior of the vehicle in any of a number of ways. In the same rudimentary embodiment discussed above with respect to the third image, for example, the controller 34 may be configured to regard the charge of each pixel in each map as either on or off. A comparator may be incorporated into the controller 34 to compare the charge of each pixel to a threshold charge. When the pixel charge is above the threshold level, the comparator outputs a high level signal corresponding to the on state of the pixel. Conversely, when the pixel charge is below the threshold level, the comparator outputs a low-level signal corresponding to the off state of the pixel. To produce black and white maps of the interior of the vehicle 8, the pixels that are off have no color and appear black whereas the pixels that are on appear as white.

Alternatively, also as discussed above with respect to the third image, in the more sophisticated embodiment, rather than a single threshold charge, each pixel in each map may be compared to a plurality of charge thresholds, such as 256 discrete charge levels, where each of the 256 charge thresholds corresponds to a different shade of gray. For instance, the controller 34 may be programmed to determine, such as through a comparison algorithm which one of the 256 discrete charge levels the charge of each pixel is nearest to. Each array of pixel charges is thereby recognizable as a black and white map of the interior of the vehicle 8.

To improve the resolution of the maps, and thereby enhance occupant detection, each of the ten maps may also be subjected to histogram processing as discussed above with respect to the third image of the interior of the vehicle 8.

To determine the presence and/or position of the occupant 14, the third image is compared to a map of the interior of the vehicle 8. More particularly, the controller 34 compares the third image to the map of the interior of the vehicle 8 to determine if all or some of the background visible in the map is or is not visible in the third image. Recall that the map is an occupant free representation of the interior of the vehicle 8. Therefore, the entire background or a vast majority thereof should be visible in the map. If some or all of the background visible in the map is not visible in the third image, then this may be indicative of the presence of the occupant 14 because the occupant may obscure all or some of the background from the purview of the image sensor 50.

If the background is a stationary background, then the third image is merely compared to the map of the interior of the vehicle 8 for that background to determine the presence of the occupant 14. However, if the background is a moveable background, a determination must first be made as to which one of a plurality of maps the third image is to be compared to. For instance, as in the example described above, where the seatback 72 constitutes the background, a determination must be made as to which one of the ten maps of the interior of the vehicle 8 the third image is to be compared to. This determination is based upon which map has a seatback position nearest the position of the seatback in the third image (e.g. the position of the seatback when the image sensor acquires the first and second images).

This determination can be performed in any of a number of ways, such as through the use of histogram processing as described above. For instance, recall that the histogram processing made edges, such as seat edges, easier to recognize. More particularly, the processing imparted a particular shade of gray into pixels that represented seatback edges and/or established a particular degree of contrast between those pixels and neighboring pixels.

As a first step in determining which map to use, the position of the seatback 72 in each map needs to be determined. To accomplish this, each of the ten maps can be examined. For instance, because each of the ten maps is a two-dimensional array of pixels representative of the interior of the vehicle 8, each pixel may correspond to a particular aspect of the interior of the vehicle. For instance, depending upon the particular vehicle platform of interest and the location of the image sensor, the controller 34 may be pre-programmed to recognize a particular block of x, y addressed pixels as representing a particular aspect of the interior of the vehicle 8. For example, given the relative location of the instrument panel 16 within the interior of the vehicle and the particular vehicle platform of interest, the instrument panel 16 may be regarded as lying within a front portion of the interior of the vehicle 8. Accordingly, given the location of the image sensor 50, the block of pixels that represents that front portion of the interior of the vehicle 8 in the two dimensional array can be recognized as "instrument panel pixels." Similarly, there may be other groups of pixels that correspond to other aspects of the interior of the vehicle.

Referring back to the example discussed above where the seatback 72 is the background and is moveable into ten different positions within the interior of the vehicle 8, even though the seatback is moveable within the interior of the vehicle, a group of "seatback pixels" can be recognized within the two dimensional array. This group of "seatback pixels" would be somewhat larger than the seatback itself such that, regardless of the position of the seatback 72, the entirety of the seatback would fall within a portion of the "seatback pixels."

The controller 34 can determine which pixels within this group of "seatback pixels" the seatback actually falls within by searching for those pixels within the group that are indicative of seatback edges (e.g. that are the particular shade of gray and/or have the particular degree of contrast with neighboring pixels). These pixels correspond to the outer limits or edges of the seatback 72. This process can be thought of as refining the location of the seatback within the group of "seatback pixels." Because the group of "seatback pixels" is part of the entire two dimensional array, refining the location of the seatback 72 within this group reduces the time it takes to locate the outline of the seatback as the entire array does not have to be scanned.

Note that the refining process can be used to refine the location of any other aspect within the interior of the vehicle 8, such as, for example, the location of the instrument panel 16. Even though the instrument panel 16 is a fixed aspect within the interior of the vehicle 8 and therefore, if the location of the image sensor 50 remains the same, the pixels that constitute the outline of the instrument panel 16 should not change, it may be desirable to refine the location of the instrument panel where, for example, the instrument panel is used as a fixed background within the images.

As mentioned above with regard to the ten maps of the interior of the vehicle 8, the pixels within each map that correspond to the outer limits or edges of the seatback 72 define the position of the seatback within that particular two-dimensional array. Accordingly, for each of the ten maps, the x, y addresses of the pixels that correspond to the outline of the seatback 72 are stored within the controller 34. This information is stored as background location data within the controller 34 for each of the ten maps so that each of the ten maps is identifiable as the map of the interior of the vehicle 8 for one particular seatback position.

Similarly, for the third image, the controller 34 may be programmed to refine the location of the seatback 72 and recognize the x, y addresses of pixels corresponding to the outline of the seatback in the third image as background location data. Note that if the occupant 14 is present on the seat, during the refining process, an outline of the occupant will also likely be developed within the outline of the seatback 72 because the occupant 14 will obscure a portion of the seatback from the purview of the image sensor 50.

To determine which map the third image is to be compared to, the controller 34 simply looks for the one map that has background location data closest to the background location data of the third image. More particularly, the controller 34, looks for the map that has x, y addresses closest to the x, y addresses of the third image. Should there be no exact match, the controller 34 can interpolate to find the closest match.

Once the controller 34 determines which particular map of the interior of the vehicle 8 the third image is to be compared to, both the third image and the map may undergo further image processing to refine their respective representations of the interior of the vehicle. For instance, the background (seatback) in each array may be filled in to appear as a solid structure within the interior of the vehicle 8. The backgrounds may be filled in, for example, by assigning the same shade of gray to each pixel within the outline of the seatback 72. Additionally, where the occupant 14 is present within the interior of the vehicle 8 and the outline of the occupant falls within the outline of the seatback 72, the seatback, in the third image, may be filled in up to the outline of the occupant. To further refine the visibility of the occupant 14, the pixels falling within the outline of the occupant can be filled in, albeit with a contrasting shade of gray. In this fashion, the occupant 14 is distinguishable from the seatback 72.

As mentioned above, the third image is compared to that map to determine the presence and/or position of the occupant 14 within the interior of the vehicle 8. More particularly, the controller 34 determines if less of the background is visible in the third image than in the map because, as mentioned above, when the occupant 14 is present within the vehicle the occupant may obstruct the image sensor's view of the background thus allowing less background to appear in the third image.

Any of several different image-processing techniques may be employed to determine whether a portion of the background visible in the map is not visible in the third image. For instance, the third image and map may be differenced, as in the manner discussed above with regard to the first and second images and/or the first and second maps, to determine whether a portion of the background visible in the map is not visible in the third image. Again because the third image and the map are each an array of pixels, the color or shade of gray of each pixel may have a value associated with it. This value may, for instance, correspond to the charge assigned to each pixel for each one of the 256 shades of gray.

Those corresponding pixels (e.g. the pixels having the same x, y address) in the third image and the map that are the same shade of gray will cancel each other out during the subtraction process. Accordingly, because the position of the seatback 72 in the map is the same or very nearly the same as the position of the seatback in the third image, the seatback will likely be removed during the pixel by pixel subtraction. If the occupant 14 is present within the interior of the vehicle 8, then only the occupant would remain after the pixel-by-pixel subtraction process. The occupant 14 can then be compared to occupant classification data stored within memory of the controller 34 to classify the occupant as any one of a number of predetermined types.

In addition to background location data corresponding to the x, y addresses of those pixels that define the outline of the background in each of the maps, information can also be stored within the controller 34 regarding the distance between the background and a particular location within the interior of the vehicle 8. For instance, given the particular platform of interest and the location of the image sensor 50, for each of ten maps, the location of the background relative to the instrument panel 16 may be stored as part of the background location data within the memory of the controller 34.

The distance between the background and a particular location within the interior of the vehicle 8 may be manually or automatically compiled into the memory of the controller 34 as a portion of the background location data. For instance, the distance between the background and the instrument panel 16 may be measured and manually programmed into the memory of the controller 34 as each of the ten maps of the interior of the vehicle 8 is developed. Alternatively, the controller 34 can calculate the location of the background relative to the instrument panel 16 for each of the ten maps. For instance, because the map is a two-dimensional array that represents the interior of the vehicle 8, each of the pixels within the two dimensional array may be thought of as representing a portion of the space within the interior of the vehicle. Accordingly, given the vehicle platform of interest and the location of image sensor 50, the controller 34 may be programmed to determine the distance between the background and the instrument panel 16 by summing the number of pixels that separate the background and the instrument panel, which contains the air bag module 20.

The controller 34 can use this information to determine the position of the occupant 14. For instance, where the seatback 72 is used as the background and a portion of the seatback is not visible within the third image, then the position of the occupant 14 with respect to the instrument panel 16, which contains the air bag module 20, can be determined to be within a range that is less than the distance between the seatback and the instrument panel. Basically, the stored information allows the controller 34 to infer the position of the occupant 14 by recognizing which aspects of the interior of the vehicle 8 the occupant is in front of.

It is to be appreciated that such position information may be utilized for any number of aspects and/or backgrounds within the interior of the vehicle 8. The controller 34 can utilize this additional information to more precisely determine the position of the occupant 14 within the interior of the vehicle 8. For instance, the distance of the occupant 14 from other aspects within the interior of the vehicle 8 can be determined again and again. Knowing the position of the occupant 14 with respect to several aspects of the interior of the vehicle 8 can help pinpoint the position of the occupant within the interior of the vehicle.

It is to be appreciated that other image processing techniques may be used to determine the presence and/or position of the occupant 14. For instance, the presence and/or position of the occupant 14 may be determined without filling in the outline of the occupant and/or the backgrounds in the third image and the map. To determine the presence of the occupant 14, the pixels within the outline of the seatback 72 within the third image may simply be scanned for an outline of the occupant. If such an outline is found, it may be compared to occupant classification data to determine the type of the occupant 14.

Additionally, depending upon the vehicle platform of interest and the location of the image sensor 50, to determine the position of the occupant 14, the controller 34 may be programmed to regard particular groups of "aspect pixels" as corresponding to locations or ranges relative to other aspects of the interior of the vehicle 8. For instance, if it is determined that the occupant 14 falls within some of the pixels within the group of "pillar pixels" then the controller 34 may utilize this information to determine that the distance of the occupant from the instrument panel 16, for example, is within a certain range corresponding to the distance from the pillar surface 70 to the instrument panel. It is to be appreciated that, depending upon the degree of resolution of the occupant 14, occupant classification data may be utilized to determine the distance of parts of the occupant 14, such as the distance of the occupant's head 76, hands 78, etc. from other aspects of the interior of the vehicle 8.

The maps of the interior of the vehicle 8 may be updated to account for changes within the interior of the vehicle. These changes may include, for instance, spills, tears, etc. The changes may affect the appearance of any aspect and/or background within the maps of interior of the vehicle 8 and therefore are ultimately incorporated within the maps so that they will be recognized as part of the background rather than as a part of the occupant 14, such as the hand 78 or arm 80. To update the maps, the controller 34 compares maps of the interior of the vehicle 8 acquired over time to determine the consistency of a tear or spill within the maps of the interior of the vehicle. The maps may be compared in any number of ways, such as through the subtraction process described above. When a tear or spill consistently appears within the maps, the controller 34 may be programmed to regard the tear or spill as part of the larger aspect, such as the seatback 72 or background within the interior of the vehicle 8. As such, the tear or spill is recognized part of the background in the map, rather than as part of the occupant 14.

It is to be appreciated that, even though the foregoing discussion has essentially been limited to situations where the background is made up of a single aspect of the interior of the vehicle 8, the background may include more than one aspect of the interior of the vehicle. For instance, both the seatback 72 and the pillar surface 70 may be included as the background. In this instance, there would be both a fixed and a moveable background. Alternatively, all of the aspects of the interior of the vehicle 8 may be included as the background. In this instance, there may need to be a variety of maps to choose from based upon the numerous combinations of moveable backgrounds.

It is to be further appreciated that the moveable aspects of the interior of the vehicle 8, such as the seatback 72, may be moveable into any number of positions. This is in contrast to the discrete number of positions (e.g. ten) that the seatback 72 was moveable into in the example discussed above. It may be impractical to store a map of the interior of the vehicle 8 for all of the different possible positions of all of the moveable aspects of the interior of the vehicle. Thus, as mentioned above, the controller 34 may be programmed to interpolate between some of the stored maps to arrive at a match for any particular position of the moveable aspects of the interior of the vehicle 8.

Figure 2:
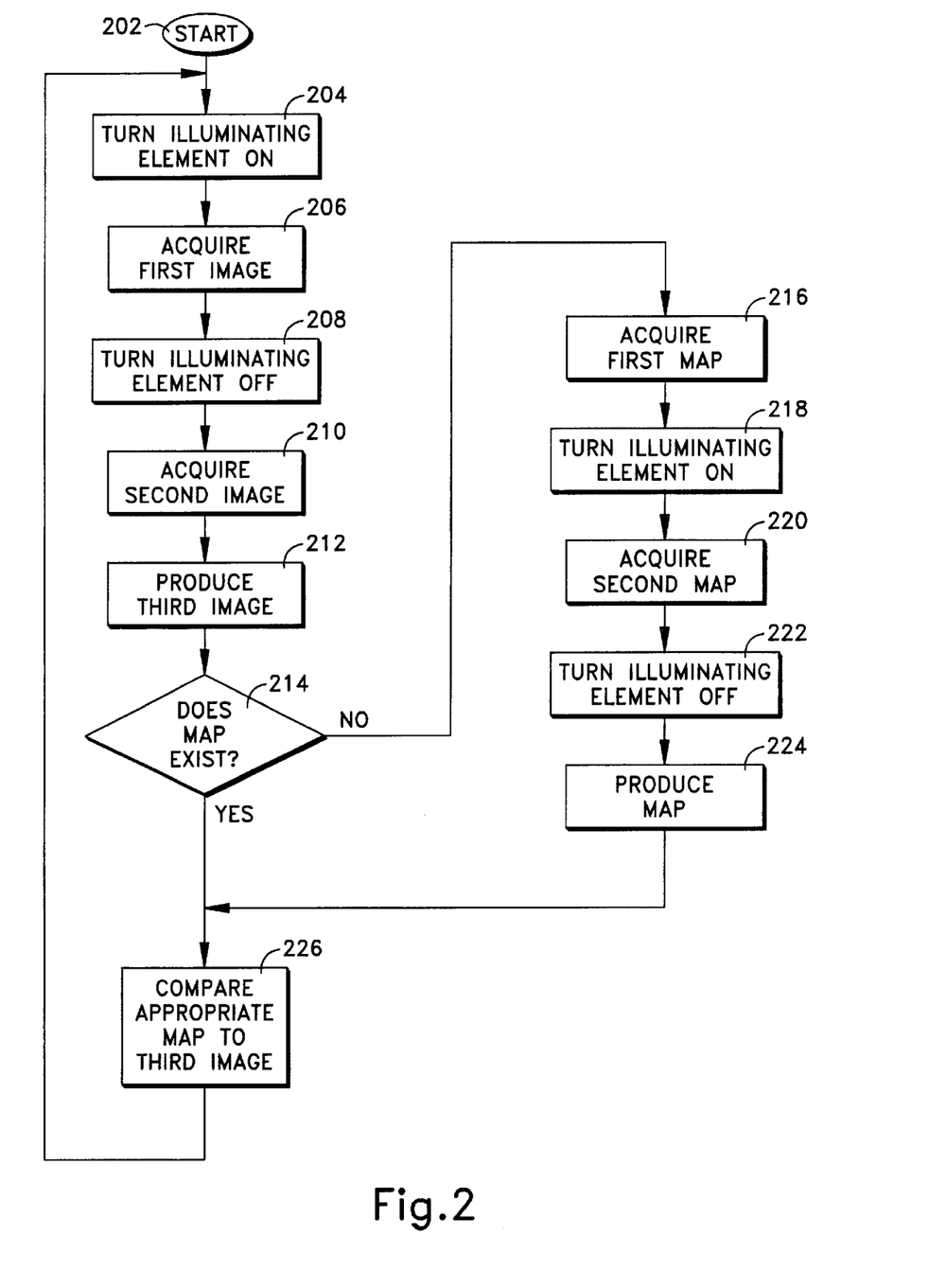
FIG. 2 is a flow chart showing a control process in accordance with the present invention.

FIG. 2 shows a flow chart of an example process 200 that is in accordance with the present invention for determining the presence and/or position of the occupant 14. The process 200 begins at start step 202, which occurs at power-up of the vehicle (i.e., when an ignition switch is turned ON). In this step, all of the internal states of the controller 34 are set to predetermined initial values and the various sensors employed in the present invention are rendered operative.

The process then proceeds to step 204 wherein the image sensor 50 acquires the first image of the interior of the vehicle 8. In this situation, the interior of the vehicle 8 is eliminated by ambient sources only. The process then proceeds to step 206 wherein the illuminating element 46 is turned ON. Recall that this may happen manually or automatically.

After step 206, the process proceeds to step 208 wherein the image sensor 50 acquires the second image of the interior of the vehicle 8. In this situation, both ambient sources as well as the illuminating element 46 illuminate the interior of the vehicle 8.

After step 208, the process proceeds to step 210 wherein the illuminating element 46 is turned OFF. After step 210, the process proceeds to step 212 wherein the third image of the interior of the vehicle 8 is produced. In this step, the first and second images are compared to one another, such as in the manner discussed above wherein corresponding pixels and the first and second images are subtracted.

The process then proceeds to step 214 wherein a determination is made as to whether or not a map exists of the interior of the vehicle 8. If a map does not exist in the interior of the vehicle 8 and therefore the determination in step 214 is negative, the process proceeds to step 216 wherein the image sensor 50 acquires a first map of the interior of the vehicle.

After step 216, the process proceeds to step 218 wherein the illuminating element 46 is turned ON. After step 218, the process proceeds to step 220 wherein the image sensor 50 acquires the second map of the interior of the vehicle 8. The process then proceeds to step 222 wherein the illuminating element 46 is turned OFF. Again recall that this may happen manually or automatically.

After step 222, the process proceeds to step 224 wherein the map of the interior of the vehicle 8 is produced. In this step, the first and second maps are compared to one another, such as in the manner described above wherein corresponding pixels within the first and second maps are subtracted from one another.

After step 224, the process proceeds to step 226 wherein the appropriate map is compared to the third image. In this step, the presence and/or position of the occupant 14 is determined, such as in the manner discussed above wherein the images are refined and then subtracted on a pixel-by-pixel basis. Note that in this step, if the background is a movable background, such as the seatback 72 discussed above, the appropriate map to which the third image is to be compared to is initially determined. Where there is no exact match, this determination may be made through interpolation as discussed above.

If the determination in step 214 is affirmative, indicating that a map of the interior of the vehicle 8 does exist, the process proceeds to directly to step 226. At step 266, the appropriate map is compared to third image in any of the manners discussed above to determine the presence and/or position of the occupant 14. Comparison of the occupant-to-occupant classification data may also occur in step 226. After step 226, the process returns to step 204 wherein the process is repeated once again.

It is to be appreciated that the process is repeated again and again to consistently monitor the presence and/or position of the occupant 14 within the vehicle 8. Additionally, as mentioned above, the first and second images and the first and second maps are promptly acquired in rapid succession such that the ambient illumination remains consistent.

Once the presence and/or position of the occupant 14 is determined in accordance with the presence invention, actuation of the air bag module 20 may be appropriately controlled in any manner, such as those described above. Continually monitoring the presence and/or position of the occupant 14, including during a crash event, allows actuation of the air bag module 20 to be controlled so as to protect the occupant 14 as needed.

From the above description of the invention, those skilled in the art will perceive improvements, changes and modifications. Such improvements, changes and modifications are intended to be included within the scope of the appended claims.

Having described the invention, the following is claimed:

1. An occupant sensing system comprising:
    an illuminating element for selectively illuminating the interior of a vehicle;
    an image sensor for acquiring a first image of the interior of the vehicle when the interior of the vehicle is illuminated by ambient sources only and for acquiring a second image of the interior of the vehicle when the interior of the vehicle is illuminated by ambient sources and said illuminating element; and
    a controller for removing the effect of ambient sources by comparing said first and second images thereby producing a third image of the interior of the vehicle as illuminated by the illuminating element only, said controller determining the presence of an occupant by comparing said third image to a produced map of the interior of the vehicle.

2. The system of claim 1 wherein no occupant is present within the interior of the vehicle in said map.

3. The system of claim 1 wherein, to produce said map, said image sensor acquires a first map of the interior of the vehicle when the interior of the vehicle is illuminated by ambient sources only and acquires a second map of the interior of the vehicle when the interior of the vehicle is illuminated by ambient sources and said illuminating element; and
    wherein said controller removes the effect of ambient sources from said map by comparing said first and second maps thereby producing said map of the interior of the vehicle as illuminated by the illuminating element only.

4. The system of claim 1 wherein said controller updates said map of the interior of the vehicle by comparing a plurality of maps produced over time.

5. The system of claim 1 wherein, when an occupant is present within the interior of the vehicle, an outline of the occupant is developed when said third image is compared to said produced map.

6. The system of claim 1 wherein an aspect of the interior of the vehicle constitutes a background within said third image and said map, said controller determining the presence of an occupant by determining whether a portion of said background visible in said map is not visible in said third image.

7. The system of claim 6 wherein said controller determines whether a portion of said background visible in said map is not visible in said third image by differencing said third image and said map.

8. The system of claim 6 wherein said controller utilizes background location data corresponding to the location of said background within said map to determine the position of an occupant.

9. The system of claim 6 wherein the aspect that constitutes said backgrounds is moveable within the interior of the vehicle, said system further including:
 a plurality of produced maps corresponding to a plurality of positions of the moveable aspect;
 background location data for said third image corresponding to the location of said moveable background within said third image; and
 background location data for each of said plurality of maps corresponding to the location of said moveable background within each of said plurality of maps, said controller comparing said background location data for said third image to said background location data for each of said plurality of maps to determine which map to compare said third image to.

10. The system of claim 9 wherein said controller utilizes occupant classification data to classify the occupant.

11. A method for sensing an occupant comprising the steps of:
 acquiring a first image of the interior of the vehicle when the interior of the vehicle is illuminated by ambient sources only;
 acquiring a second image of the interior of the vehicle when ambient sources and an illuminating element illuminate the interior of the vehicle;
 removing the effect of ambient sources by comparing the first and second images thereby producing a third image of the interior of the vehicle as illuminated by the illuminating element only; and
 determining the presence of an occupant by comparing the third image to a produced map of the interior of the vehicle.

12. The method of claim 11 further comprising the steps of:
 acquiring a first map of the interior of the vehicle when the interior of the vehicle is illuminated by ambient sources only;
 acquiring a second map of the interior of the vehicle when the interior of the vehicle is illuminated by ambient sources and the illuminating element; and
 removing the effect of ambient sources from the map by comparing the first and second maps thereby producing the map of the interior of the vehicle as illuminated by the illuminating element only.

13. The method of claim 11 further comprising the step of updating the map of the interior of the vehicle by comparing a plurality of maps produced over time.

14. The method of claim 11 further comprising the step of developing an outline of the occupant when the third image is compared to the produced map.

15. The method of claim 11 further comprising the step of determining the presence of an occupant by determining whether a portion of a background visible in the map is not visible in the third image.

16. The method of claim 15 further comprising the step of differencing the third image and the map to determine whether a portion of the background visible in the map is not visible in the third image.

17. The method of claim 15 further comprising the step of utilizing background location data corresponding to the location of the background within the map to determine the position of an occupant.

18. The method of claim 15 further comprising the steps of:
 comparing background location data corresponding to the location of a moveable background within the third image to background location data corresponding to the location of the moveable background within each of a plurality of maps to determine which map to compare the third image to.

19. The method of claim 18 further comprising the step of utilizing occupant classification data to classify the occupant.

* * * * *